United States Patent
Kuo et al.

(10) Patent No.: US 11,640,033 B2
(45) Date of Patent: May 2, 2023

(54) OPTICAL DEVICE, OPTICAL SYSTEM AND METHOD OF FORMING THE SAME

(71) Applicant: Taiwan Semiconductor Manufacturing Company, Ltd., Hsinchu (TW)

(72) Inventors: Feng-Wei Kuo, Hsinchu County (TW); Chewn-Pu Jou, Hsinchu (TW); Cheng-Tse Tang, Hsinchu (TW); Hung-Yi Kuo, Taipei (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 97 days.

(21) Appl. No.: 17/140,134

(22) Filed: Jan. 4, 2021

(65) Prior Publication Data
US 2022/0214501 A1 Jul. 7, 2022

(51) Int. Cl.
*G02B 6/30* (2006.01)
(52) U.S. Cl.
CPC .................................. *G02B 6/305* (2013.01)
(58) Field of Classification Search
CPC ...... G02B 6/1228; G02B 6/124; G02B 6/125; G02B 6/13; G02B 6/136; G02B 6/138; G02B 6/14; G02B 6/305; B29C 2035/0827
See application file for complete search history.

(56) References Cited

U.S. PATENT DOCUMENTS

| | | | |
|---|---|---|---|
| 9,000,584 B2 | 4/2015 | Lin et al. | |
| 9,048,222 B2 | 6/2015 | Hung et al. | |
| 9,048,233 B2 | 6/2015 | Wu et al. | |
| 9,064,879 B2 | 6/2015 | Hung et al. | |
| 9,111,949 B2 | 8/2015 | Yu et al. | |
| 9,263,511 B2 | 2/2016 | Yu et al. | |
| 9,281,254 B2 | 3/2016 | Yu et al. | |
| 9,368,460 B2 | 6/2016 | Yu et al. | |
| 9,372,206 B2 | 6/2016 | Wu et al. | |
| 9,496,189 B2 | 11/2016 | Yu et al. | |
| 10,429,582 B1 * | 10/2019 | Bian | G02B 6/1228 |
| 2022/0019021 A1 * | 1/2022 | Piper | G02B 6/1228 |

* cited by examiner

*Primary Examiner* — Michael P Mooney
(74) *Attorney, Agent, or Firm* — JCIPRNET

(57) ABSTRACT

An optical coupler is provided. The optical coupler includes: a first optical structure, and a second optical structure disposed over the first optical structure. The first optical structure includes: a first substrate, a first cladding layer disposed on the first substrate, and a first waveguide disposed on the first cladding layer. The first waveguide includes a first coupling portion, and the first coupling portion including a first taper part. The second optical structure includes: a second substrate, a dielectric layer disposed on the second substrate; and a second waveguide disposed on the dielectric layer. The second waveguide includes a second coupling portion, and the second coupling portion including a second taper part. The second taper part is disposed on and optically coupled with the first taper part, and a taper direction of the first taper part is the same as a taper direction of the second taper part.

20 Claims, 20 Drawing Sheets

OPTICAL DEVICE, OPTICAL SYSTEM AND METHOD OF FORMING THE SAME

BACKGROUND

The growth of the internet and network traffic rate is pushing a demand for optical-based data communication. Many of optical components used in the optical-based data communication systems may be fabricated in semiconductor devices, and may be further integrated as a silicon photonic integrated chips (PIC) for high-speed optical interconnects. The optical signal is typically transmitted from an optical fiber to PIC through a silicon waveguide. However, the size of the silicon waveguide in a PIC is typically much smaller than the core diameter of an optic fiber, which may lead to a significant signal loss. It is important to properly directs the optical signal from the optical fiber to the silicon waveguide and vice versa without significant signal loss.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
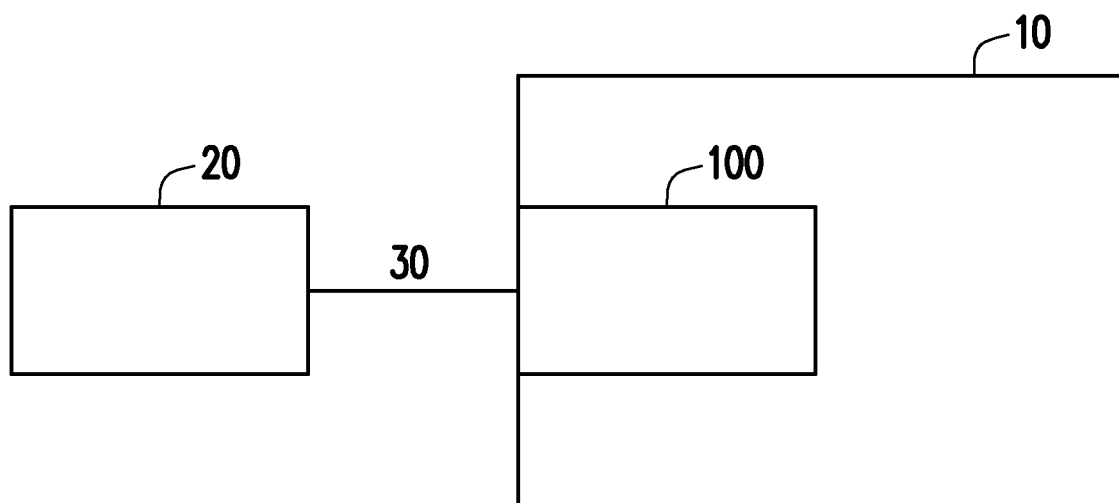
FIG. 1 is a schematic view of an optical system according to some exemplary embodiments of the present disclosure.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In addition, terms, such as "first", "second", "third" and the like, may be used herein for ease of description to describe similar or different element(s) or feature(s) as illustrated in the figures, and may be used interchangeably depending on the order of the presence or the contexts of the description.

Other features and processes may also be included. For example, testing structures may be included to aid in the verification testing of the 3D packaging or 3DIC devices. The testing structures may include, for example, test pads formed in a redistribution layer or on a substrate that allows the testing of the 3D packaging or 3DIC, the use of probes and/or probe cards, and the like. The verification testing may be performed on intermediate structures as well as the final structure. Additionally, the structures and methods disclosed herein may be used in conjunction with testing methodologies that incorporate intermediate verification of known good dies to increase the yield and decrease costs.

FIG. 1 is a schematic view of an optical system 1. The optical system 1 includes an optical device 10. In some embodiments, the optical device 10 is a photonic integrated chip (PIC) or the like. The optical system further includes an optical source 20. In some embodiments, the optical source 20 is a laser source or the like. The optical system 1 further includes an optical fiber 30, wherein one end of the optical fiber 30 connects with the optical source 20, and the other end of the optical fiber 30 connects with the optical coupler 100 of the optical device 10. When an optical signal is generated from the optical source 20, the optical signal is transmitted to the optical coupler 100 of the optical device 10 through the optical fiber 30. The optical coupler 100 receives the optical signal from the optical fiber 30 and transmits the optical signal to the optical device 10.

In some situations, the width of the optical fiber 30 is about 9 μm, and the width of a typical silicon waveguide in an optical device is about 0.2 μm, which is much smaller than the width of the optical fiber 30. When the optical signal is transmitted from the optical fiber 30 to the silicon waveguide of the optical device 10, since the width of the silicon waveguide is much smaller than the width of the optical fiber 30, there may be a significant signal loss when transmitting the optical signal from the optical fiber 30 to the optical device 10.

In order to reduce the signal loss when transmitting the optical signal from the optical fiber 30 to the optical device 10, the optical signal is first received by the optical coupler 100. The optical coupler 100 includes two optical waveguides. The first waveguide of the optical coupler 100, which has a width substantially the same as the optical fiber 30, receives the optical signal from the optical fiber 30. Since the width of the first waveguide of the optical coupler 100 is compatible to the width of the optical fiber, the signal loss between the optical fiber 30 and the optical coupler 100 is significantly reduced. The optical signal received by the first waveguide of the optical coupler 100 is then coupled to the second waveguide, and further transmits to the optical device 10 through adiabatic coupling. Specifically, the second waveguide is part of the photonic IC, which is a silicon waveguide, the width of the second waveguide of the optical coupler 100 is compatible to the width of the silicon waveguide of the optical device 10. Therefore, the optical signal may be easily transmitted to the optical device through the second waveguide. As a result, a signal loss due to the mismatch between the width of the optical fiber 30 and the width of the silicon waveguide in the optical device 10 may be significantly reduced by the optical coupler 100.

Figure 2A:
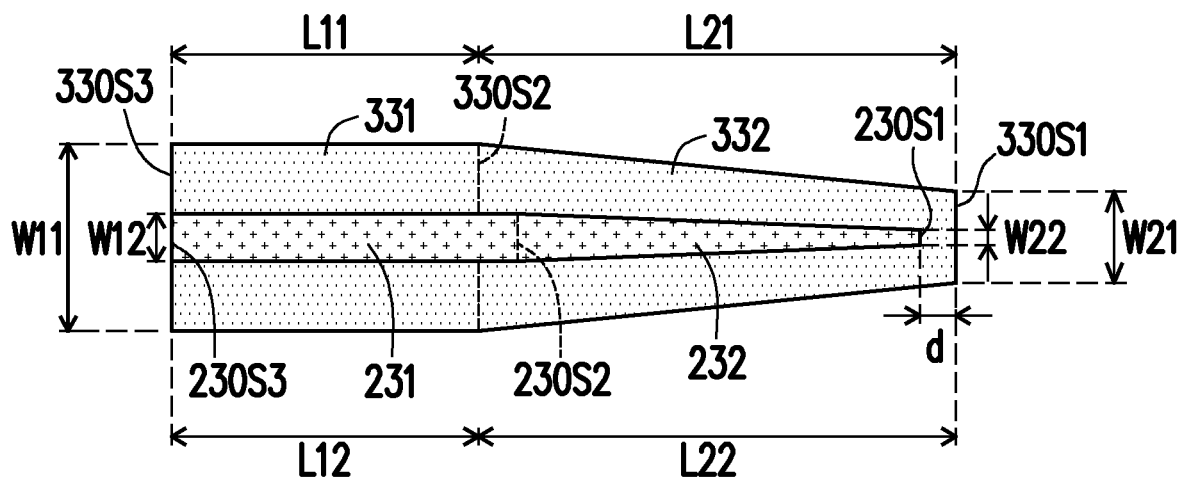
FIGS. 2A and 2B are top view and side view of a portion of the optical coupler according to some exemplary embodiments of the present disclosure.
Figure 2B:
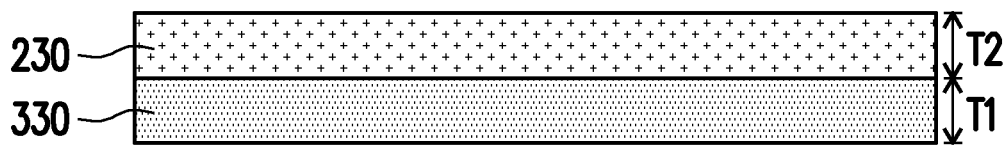

FIGS. 2A and 2B illustrate a portion of the optical coupler 100. FIG. 2A is a top view of a portion of the optical coupler 100. FIG. 2B is a side view of a portion of the optical coupler 100. Some components of the optical coupler 100 are not illustrated in FIGS. 2A and 2B for clarity.

The optical coupler 100 includes a first waveguide 330 and a second waveguide 230. As shown in FIGS. 2A and 2B, the second waveguide 230 is disposed on the first waveguide 330. The overlapped portions the first waveguide 330 and the second waveguide 230 may also be referred as coupling portions of the first waveguide 330 and the second waveguide 230. The coupling portion of second waveguide 230 is optically coupled to the coupling portion of the first waveguide 330. The coupling portion of the first waveguide 330 includes a straight part 331 and a taper part 332. The coupling portion of the second waveguide 230 includes a straight part 231 and a taper part 232. The taper part 232 of the second waveguide 230 is optically coupled with the taper part 332 of the first waveguide 330. The straight part 231 of the second waveguide 230 is optically coupled with the straight part 331 of the first waveguide 330.

When an optical signal enters the optical coupler 100, the optical signal will first enter the optical coupler 100 through the taper part 332 of the first waveguide 330. Then the optical signal in the taper part 332 of the first waveguide 330 is then optically coupled and transferred to the taper part 232 of the second waveguide 230 through adiabatic optical coupling.

In the adiabatic optical process, the geometrical changes of the taper part 332 of the first waveguide 330 and the taper part 232 of the second waveguide 230 are sufficient gradual, such that no energy is transferred from the incoming mode of the optical signal to other modes of the optical signal. In other words, the fundamental-order mode of the optical signal propagates through the structures such as the taper part 332 of the first waveguide 330 and the taper part 232 of the second waveguide 230 without transfer of power to any higher-order guided or radiative modes. As a result, the optical signal received by the optical coupler 100 may be lossless in the optical coupler 100.

In some embodiments, a material of the first waveguide 330 includes a polymer material, such as silioxane-based polymers, or include a combination of polymer materials, such as poly(methylmethacrylate) (PMMA), polystyrene (PS), polycarbonate, polyurethane, benzocyclo butane, perfluorovinyl ether cyclopolymer, tetrafluoroethylene, perfluorovinyl ether copolymer, silicone, fluorinated poly(arylene) ether sulfide, poly(pentafluorostyrene), fluorinated dendrimers, fluorinated hyperbranched polymers, or the like. In some embodiments, a material of the second waveguide 230 includes doped silicon, undoped silicon, silicon nitride, silicon oxynitride or the like. In some embodiments, the index of refraction of the material of the first waveguide 330 is between 1.5 to 1.8. In some embodiments, the index of refraction of the material of the second waveguide 230 is between 3.4 to 3.6. Referring to FIG. 2B, in some embodiments the thickness T1 of the first waveguide 330 is between 2 µm to 6 µm. In some embodiments, the thickness T1 of the first waveguide 330 is larger than 3 µm. In some embodiments the thickness T2 of the second waveguide 230 is between 200 nm to 500 µm. In some embodiments, the thickness T2 of the second waveguide 230 is larger than 270 nm.

The taper part 332 of the first waveguide 330 has a wider end 330S2 and a narrower end 330S1. The wider end 330S2 of the taper part 332 of the first waveguide 330 has a width W11, and the narrower end 330S1 of the taper part 332 of the first waveguide 330 has a width W21 The length of the taper part 332 of the first waveguide 330 is L21.

The straight part 331 of the first waveguide 330 connects with the wider end 330S2 of the taper part 332. In some embodiments, the straight part 331 of the first waveguide 330 has a constant width, wherein the width of one end 330S2 of the straight part 331 of the first waveguide 330 has a same width of the other end 330S3 of the straight part 331 of the first waveguide 330, which is W11, equal to the width of the wider end of the taper part 332 of the first waveguide 330. The straight part 331 of the first waveguide 330 has a length L11 and a width W11.

The taper part 232 of the second waveguide 230 has a wider end 230S2 and a narrower end 230S1. The wider end 230S2 of the taper part 232 of the second waveguide 230 has a width W12, and the narrower end 230S1 of the taper part 232 of the second waveguide 230 has a width W22 The length of the taper part 232 of the second waveguide 230 is L22.

The straight part 231 of the second waveguide 230 connects with the wider end 230S2 of the taper part 232. In some embodiments, the straight part 231 of the second waveguide 230 has a constant width, wherein the width of one end 230S2 of the straight part 231 of the second waveguide 230 has a same width of the other end 230S3 of the straight part 231 of the second waveguide 230, which is W12, equal to the width of the wider end of the taper part 232 of the second waveguide 230. The straight part 231 of the second waveguide 230 has a length L12 and a width W12.

In some embodiments, the total length of the second waveguide 230, which is the length L12 of the straight part 231 and the length L22 of the taper part 232, is smaller than the total length of the first waveguide 330, which is the length L11 of the straight part 331 and the length L21 of the taper part 332.

In some embodiments, the width W12 of the end 230S3 the straight part 231 of the second waveguide 230 is smaller than the width W11 of the end 330S3 of the straight part 331 of the first waveguide 330. In some embodiments, the width W22 of the narrower end 230S1 of the taper part 232 of the second waveguide 230 is smaller than the width W21 of the narrower end 330S1 of the taper part 332 of the first waveguide 330.

In some embodiments, the narrower end 230S1 of the taper part 232 of the second waveguide 230 is separated from the narrower end 330S1 of the taper part 332 of the first waveguide 330 by a distance d. In some embodiments, the distance d is between 0 µm to 500 µm.

In some embodiments, the optical signal is transmitted between the first waveguide 330 and the second waveguide 230 through the adiabatic optical process. In some embodiment, in the first waveguide 330, the width W11 of the end 330S3 of the straight part 331 is between 1 µm to 10 µm. In some embodiments, the width W11 of the end 330S3 of the straight part 331 is larger than 3 µm. In some embodiment, the minimum width W21 of the narrower end 330S1 of the taper part 332 is between 200 nm to 5000 nm (i.e. 5 µm). In some embodiment, the minimum width W21 of the narrower end 330S1 of the taper part 332 is larger than 1.6 µm. In some embodiments, the length L11 of the straight part 331 is between 500 µm to 5000 µm. In some embodiments, the length L11 of the straight part 331 is larger than 500 µm. In some embodiments, the length L21 of the taper part 332 is between 100 µm to 5000 µm. In some embodiments, the length L21 of the taper part 332 is smaller than 500 µm. In some embodiments, for broadband optical signal transmission, such as the optical signal having wavelength between 126 nm to 136 nm, the total length of the first waveguide 330, which is total the length of the taper part 332 and the straight part 331, is less than 1000 nm.

In some embodiments, in the first waveguide 330, a ratio of the length L11 of the straight part 331 to the length L21 of the taper part 332 is between 1:1 to 1:4. In some embodiments, in the first waveguide 330, a ratio of the width W21 of the narrower end 33051 of the taper part 332 to the length L21 of the taper part 332 is between 1.6:500 to 1.6:5000.

In some embodiment, in the second waveguide 230, the width W12 of the end 230S3 of the straight part 231 is between 0.2 µm to 5 µm. In some embodiment, in the second waveguide 230, the width W12 of the end 230S3 of the straight part 231 is larger than 0.2 µm. In some embodiment, the width W22 of the narrower end 23051 of the taper part 232 is between 60 nm to 5000 nm (i.e. 5 µm). In some embodiment, the minimum width W22 of the narrower end 23051 of the taper part 232 is larger than 60 nm. In some embodiments, the length L12 of the straight part 231 is between 500 µm to 5000 µm. In some embodiments, the length L12 of the straight part 231 is larger than 500 µm. In some embodiments, the length L22 of the taper part 232 is between 100 µm to 5000 µm. In some embodiments, the length L22 of the taper part 332 is smaller than 500 µm. In some embodiments, for broadband optical signal transmission, such as the optical signal having wavelength between 126 nm to 136 nm, the total length of the silicon waveguide 230, which is total the length of the taper part 232 and the straight part 231, is less than 1000 nm.

In some embodiments, in the second waveguide 230, a ratio of the length L12 of the straight part 231 to the length L22 of the taper part 232 is between 1:1 to 1:3.99, and a ratio of the width W22 of the narrower end 230S1 of the taper part 232 to the length L22 of the taper part 232 is between 1.6:499 to 1.6:4999.

In some embodiments, a ratio of a length L21 of the taper part 332 of the first waveguide 330 to a length L22 of the taper part 232 of the second waveguide 230 is smaller than or substantially equal to 1:3.

In some embodiments, a longitudinal axis of the second waveguide 230 and a longitudinal axis of the first waveguide 330 are substantially aligned from a top view of the optical coupler 100. In some embodiments, the offset between the longitudinal axis of the second waveguide 230 and the longitudinal axis of the first waveguide 330 from the top view is less than 5 µm. With the second waveguide 230 and the first waveguide 330 substantially aligned with each other, the optical signal may be transmitted between the two waveguides more efficiently and with less signal loss.

Figure 3A:
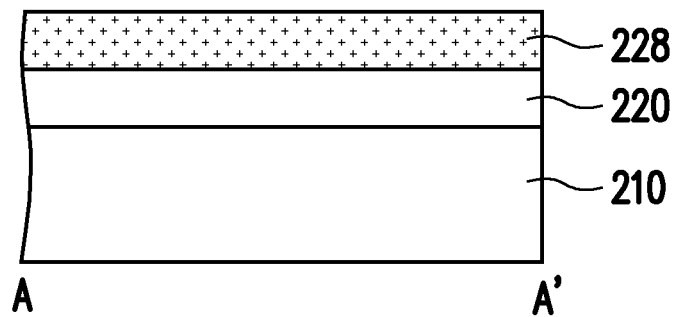
FIG. 3A to FIG. 12 are schematic cross-sectional views of various stages in a manufacturing method of an optical coupler according to some exemplary embodiments of the present disclosure.
Figure 3B:
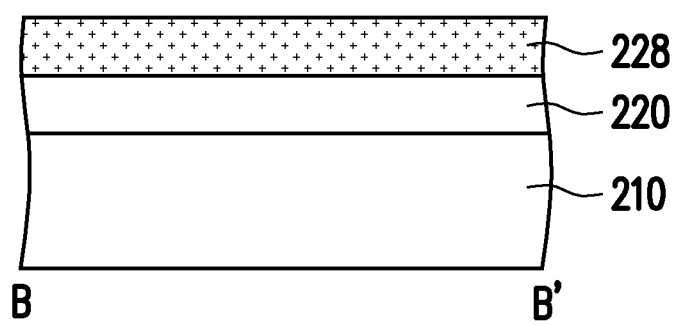
Figure 3C:
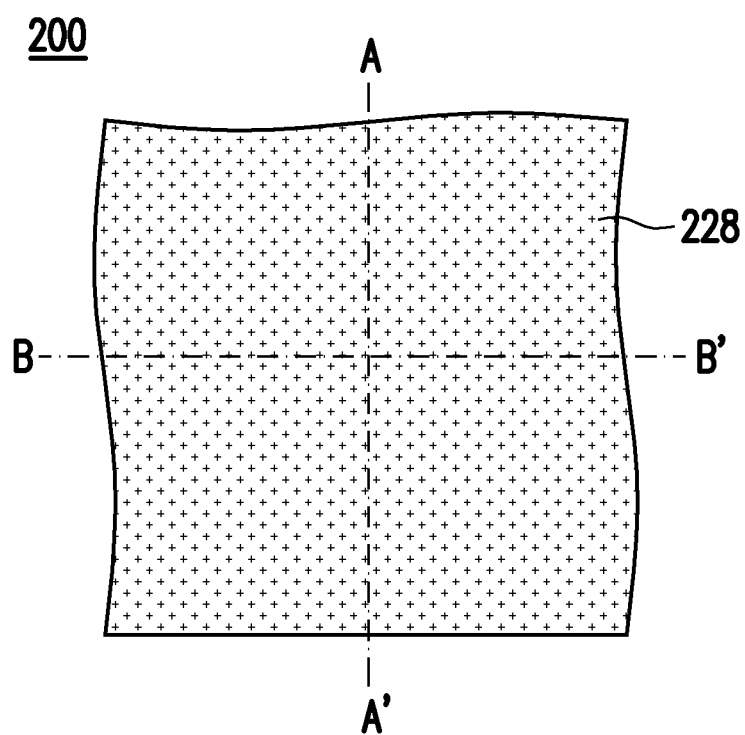

FIGS. 3A to 3C and FIGS. 4A to 4D show a process for forming a waveguide 230, in accordance with some embodiments. FIG. 3A and FIG. 3B are cross-sectional views of FIG. 3C along line AK and line BB' and FIG. 3C is a top view of an optical structure 200. Referring to FIGS. 3A to 3C, a substrate 210 is provided. A dielectric layer 220 is formed over the substrate 210. A silicon layer 228 is formed over the dielectric layer 220. In some embodiments, the substrate 210 is a material such as a glass, ceramic, dielectric, or a semiconductor substrate. In some embodiments, the substrate 210 includes a bulk semiconductor or the like, which is doped (e.g., with a p-type or an n-type dopant) or undoped. In some embodiments, the substrate 210 is a wafer, such as a silicon wafer or other type of semiconductor wafer. Other substrate materials, such as a multi-layered or gradient substrate may also be used. In some embodiments, the material of the substrate 210 include silicon, germanium, a compound semiconductor including silicon carbide, gallium arsenic, gallium phosphide, indium phosphide, indium arsenide, and/or indium antimonide, an alloy semiconductor including SiGe, GaAsP, AlInAs, AlGaAs, GaInAs, GaInP, and/or GaInAsP, the like, or combinations thereof. In some embodiments, the substrate 210 is a silicon photonic integrated chip (PIC) including electrical circuitries and at least one waveguide. In some embodiments, the dielectric layer 220 is an oxide layer. In some embodiments, the dielectric layer 220 is a silicon oxide or the like. In some embodiments, the dielectric layer 220 is also referred as an oxide layer 220. In some embodiments, the dielectric layer has a thickness between about 2 µm to about 3 µm. The silicon layer 228 includes doped silicon, undoped silicon, silicon nitride, silicon oxynitride or the like. In some embodiments, the silicon layer 228 has a thickness between about 200 nm to about 500 nm. In some embodiments, the silicon layer has a thickness larger than 270 nm. In some embodiments, the substrate 210, the dielectric layer 220, and the silicon layer 228 is formed as a buried oxide ("BOX") substrate.

Figure 4A:
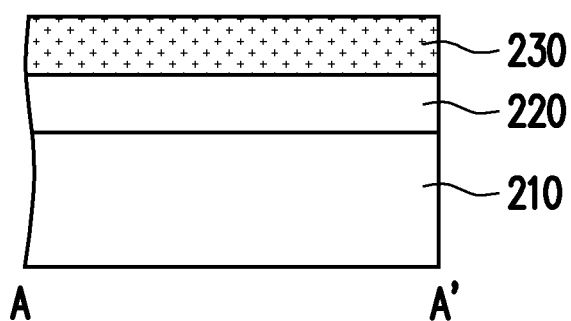
Figure 4B:
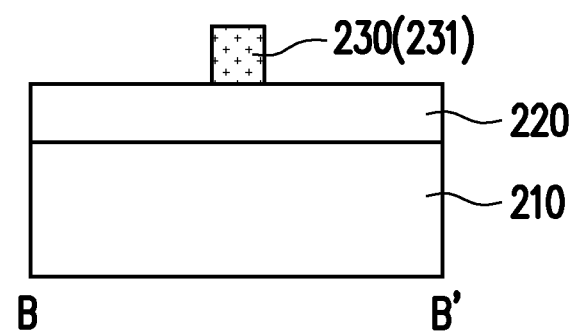
Figure 4C:
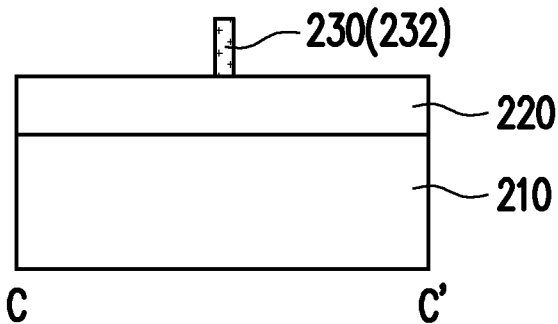
Figure 4D:
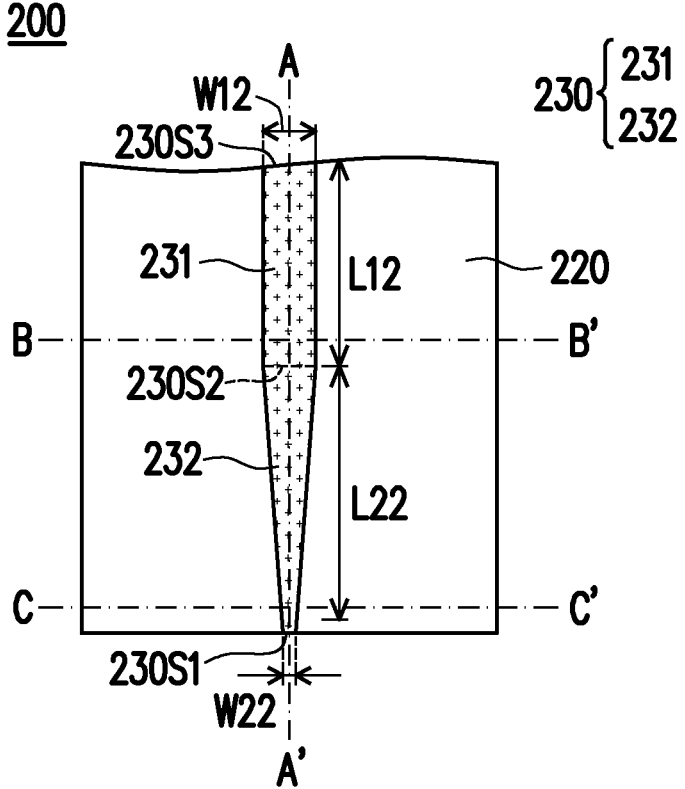

FIG. 4A, FIG. 4B and FIG. 4C are cross-sectional views of FIG. 4D along line AK, line BB', and line CC, and FIG. 4D is a top view of the optical structure 200. Referring to FIGS. 4A to 4D, the silicon layer 228 is patterned to form the silicon waveguide 230. The silicon layer 228 may be patterned by using photolithography and etching techniques. In some embodiments, a hard-mask layer (e.g., a nitride layer or other dielectric material, not shown in FIGS. 4A to 4D) is formed over the silicon layer 228 and be patterned. The pattern of the hard-mask layer may then be transferred to the silicon layer 228 using one or more etching techniques. In some embodiments, the etching technique includes dry etching and/or wet etching techniques. In some embodiments, more than one photolithography and etching sequence are used in order to pattern the silicon layer 228 into a silicon waveguide 230.

As shown in FIGS. 4B, 4C and 4D, the waveguide 230 includes a straight part 231 and a taper part 232. The taper part 232 has a wider end 230S2 and a narrower end 230S1. The wider end 230S2 of the taper part 232 has a width W12, and a narrower end 230S1 of the taper part 232 has a width W22. A length of the taper part 232 is L22. One end of the straight part 231 connects with a wider end 230S2 of the taper part 232, and a width of the other end 230S3 of the straight part 231 is W12, which is the same as the width of the wider end 230S2 of the taper part 232. A length of the straight part 231 is L12.

Referring to FIGS. 4B and 4C, line BB' crosses the straight part 231 and line CC' crosses the taper part 232. As a result, the width of the waveguide 230 in FIG. 4B, which is the width of the straight part 231, is wider than the width of the waveguide 230 in FIG. 4C, which is the width of the taper part 232.

In some embodiment, the width W12 of the end 230S3 of the straight part 231 is larger than 0.2 µm. In some embodiment, the width W22 of the narrower end 230S1 of the taper part 232 is between 60 nm to 5000 nm (i.e. 5 µm). In some embodiment, the minimum width W22 of the narrower end 230S1 of the taper part 232 is larger than 60 nm. In some embodiments, the length L12 of the straight part 231 is between 500 µm to 5000 µm. In some embodiments, the length L12 of the straight part 231 is larger than 500 µm. In some embodiments, the length L22 of the taper part 232 is between 100 μm to 5000 μm. In some embodiments, the length L22 of the taper part 332 is smaller than 500 μm. In some embodiments, for broadband optical signal transmission, such as the optical signal having wavelength between 126 nm to 136 nm, the total length of the waveguide 230, which is total the length of the taper part 232 and the straight part 231, is less than 1000 nm.

After the waveguide 230 is patterned, a singulation step is performed on the wafer to separate the wafer into a plurality of photonic IC dies. In some embodiments, the singulation process includes sawing, laser ablation, etching, a combination thereof, or the like.

Figure 5A:
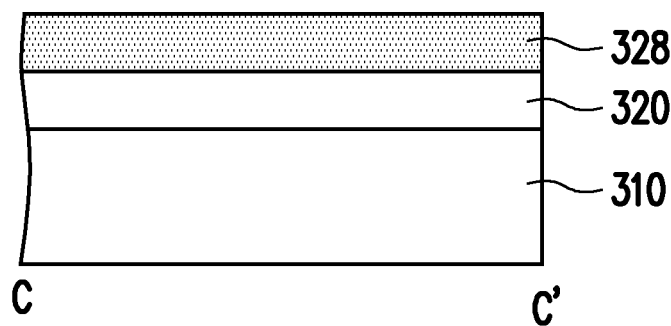
Figure 5B:
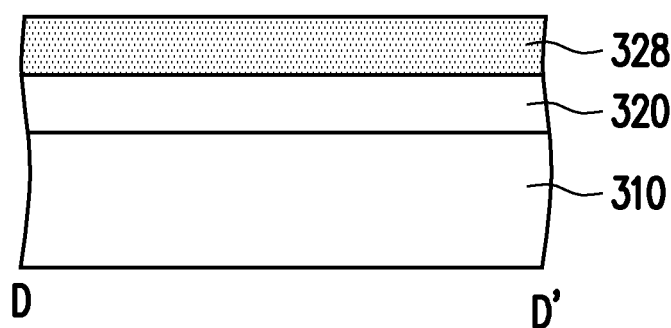
Figure 5C:
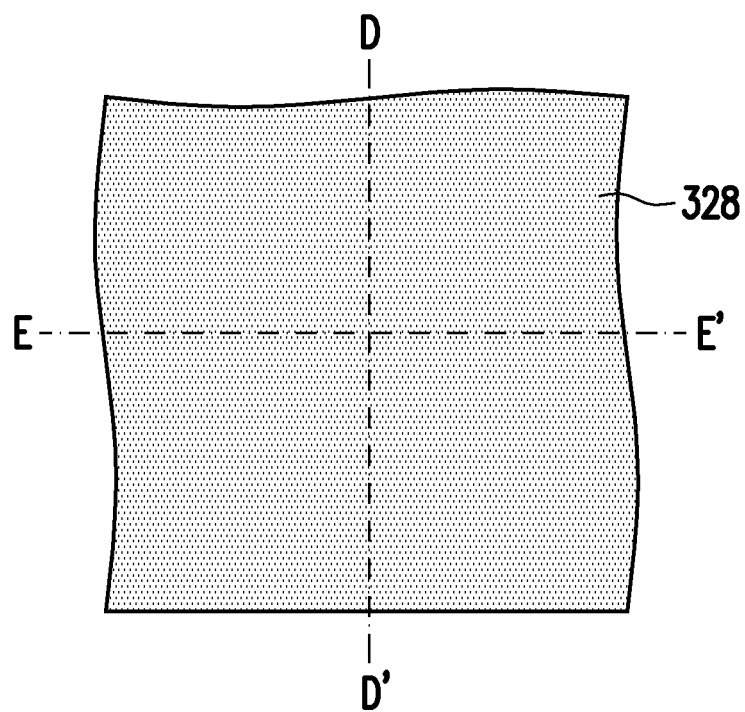

FIG. 5A and FIG. 5B are cross-sectional views of FIG. 5C along line DD' and line EE' and FIG. 5C is a top view of an optical structure 300. Referring to FIG. 5A to FIG. 5C, a substrate 310 is provided. In some embodiments, the material of the substrate 310 includes materials such as silicon, silicon oxide, gallium arsenide, silicon nitride, glass, quartz, plastics, ceramics, crystalline materials and the like.

A cladding layer 320 is formed over the substrate 310. In some embodiments, the cladding layer 320 is made of silicon resin, which is an optical resin and forms a transparent layer. The refractive index of the cladding layer 320 is lower than the refractive index of the core layer 328. In some embodiments, the material of the cladding layer 320 includes materials such as silicon resins, polysiloxanes, fluorinated polysiloxanes, with fluorinated substituents such as methyl groups or phenyl groups, or the like. In some embodiments, the cladding layer 320 is formed on the substrate 310 through doctor-blade coating, or spin-coating or other suitable methods. After the cladding layer 320 is deposited on the substrate 310, the cladding layer 320 is exposed with radiation, such as ultra-violet (UV) light to cure the cladding layer 320.

After the cladding layer 320 is formed on the substrate 310, a waveguide core layer 328 is formed on the under cladding layer 320. In some embodiments, the material of the core layer 328 depends on the optical bands the waveguide to be operated. In some embodiments, the core layer 328 is designed to operate in the O-band (around λ=1310 nm) and C-band (around λ=1550 nm). In some embodiments, the material of the core layer 328 includes silioxane-based polymers. In some embodiments, the material of the core layer 328 includes a combination of polymer materials, such as poly(methylmethacrylate) (PMMA), polystyrene (PS), polycarbonate, polyurethane, benzocyclo butane, perfluorovinyl ether cyclopolymer, tetrafluoroethylene, perfluorovinyl ether copolymer, silicone, fluorinated poly(arylene) ether sulfide, poly(pentafluorostyrene), fluorinated dendrimers, fluorinated hyperbranched polymers, or the like. In some embodiments, the core layer 328 is formed on the cladding layer 320 through doctor-blade coating, or spin-coating or other suitable methods. In some embodiments, the material of the core layer 328 is selected to have an index of refraction larger than the index of refraction of the cladding layer 320 to ensure the proper light propagation of the polymer waveguide 330 which will be formed in later steps. In some embodiments, the difference of the index of refraction (Δn) between the core layer 328 and the cladding layer 320 is between 0.005 to 0.008. In some embodiments, a thickness of the core layer 328 is between 2 μm to 6 μm. In some embodiments, the thickness of the core layer 328 is larger than 3 μm.

Figure 6A:
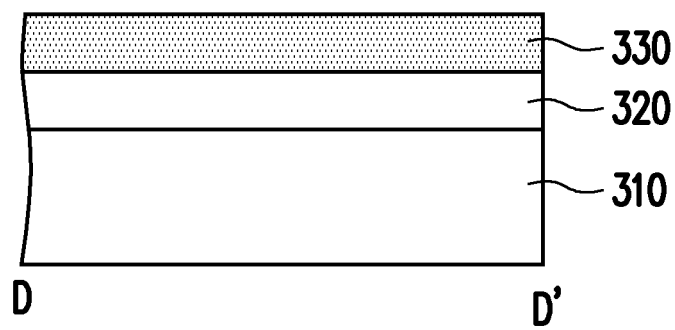
Figure 6B:
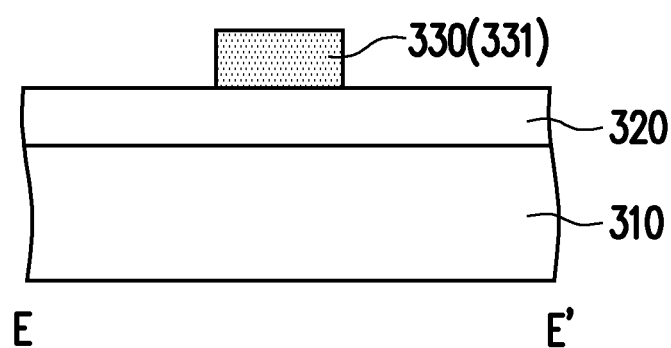
Figure 6C:
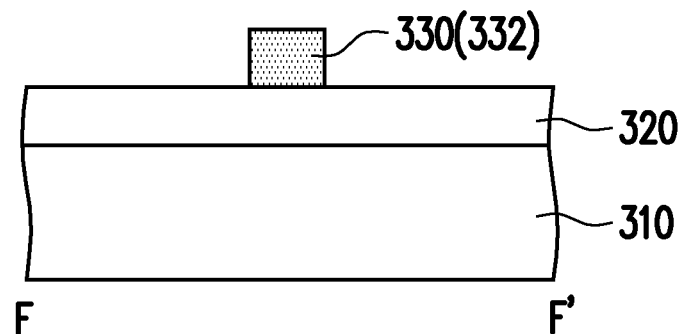
Figure 6D:
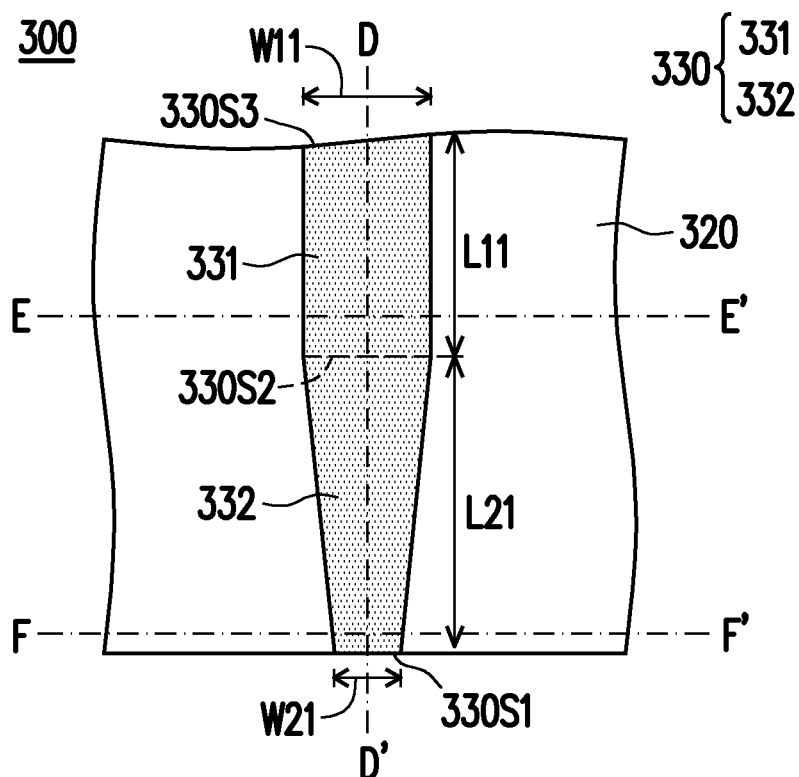

FIG. 6A, FIGS. 6B and 6C are cross-sectional views of FIG. 6D along line DD', line EE' and line FF', and FIG. 6D is a top view of the optical structure 300. Referring to FIGS. 6A to 6D, after the core layer 328 is deposited on the cladding layer 320, the core layer 328 is patterned to form the waveguide 330. In some embodiments, the core layer 328 is patterned through a UV-laser direct writing process, or a proximity-mask-lithography or other suitable methods. After the patterning process, the patterned core layer 328 is treated with a solvent-based wet-chemical development process to develop the pattern of the core layer 328 and remove the unwanted portions of the core layer 328. After the patterning and developing process, the core layer 328 becomes the waveguide 330, as shown in FIGS. 6A to 6D.

As shown in FIGS. 6B, 6C and 6D, the waveguide 330 includes a straight part 331 and a taper part 332. The taper part 332 has a wider end 330S2 and a narrower end 330S1. The wider end 330S2 of the taper part 332 has a width W11, and a narrower end 330S1 of the taper part 332 has a width W21. A length of the taper part 332 is L21. One end of the straight part 331 connects with the wider end 330S2 of the taper part 332, and a width of the other end 330S3 of the straight part 331 is W11, which is the same as the width of the wider end 330S2 of the taper part 332. A length of the straight part 331 is L11.

FIGS. 6B and 6C are cross-sectional views of the line EE' and line FF' of the waveguide 330 in FIG. 6D. Referring to FIGS. 6B and 6C, line EE' crosses the straight part 331 and line FF' crosses the taper part 332. As a result, the width of the waveguide 330 in FIG. 6B, which is the width of the straight part 331, is wider than the width of the waveguide 330 in FIG. 6C, which is the width of the taper part 332.

In some embodiment, the width W11 of the end 330S3 of the straight part 331 is between 1 um to 10 μm. In some embodiments, the width W11 of the end 330S3 of the straight part 331 is larger than 3 μm. In some embodiment, the minimum width W21 of the narrower end 330S1 of the taper part 332 is between 200 nm to 5000 nm (i.e. 5 μm). In some embodiment, the minimum width W21 of the narrower end 330S1 of the taper part 332 is larger than 1.6 μm. In some embodiments, the length L11 of the straight part 331 is between 500 μm to 5000 μm. In some embodiments, the length L11 of the straight part 331 is larger than 500 μm. In some embodiments, the length L21 of the taper part 332 is between 100 μm to 5000 μm. In some embodiments, the length L21 of the taper part 332 is smaller than 500 μm. In some embodiments, for broadband optical signal transmission, such as the optical signal having wavelength between 126 nm to 136 nm, the total length of the waveguide 330, which is total the length of the taper part 332 and the straight part 331, is less than 1000 nm.

Figure 7A:
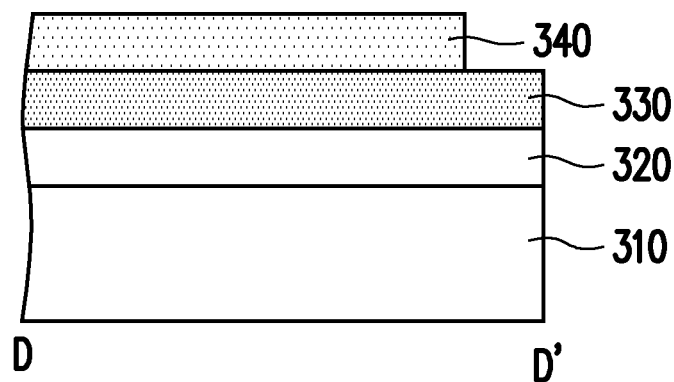
Figure 7B:
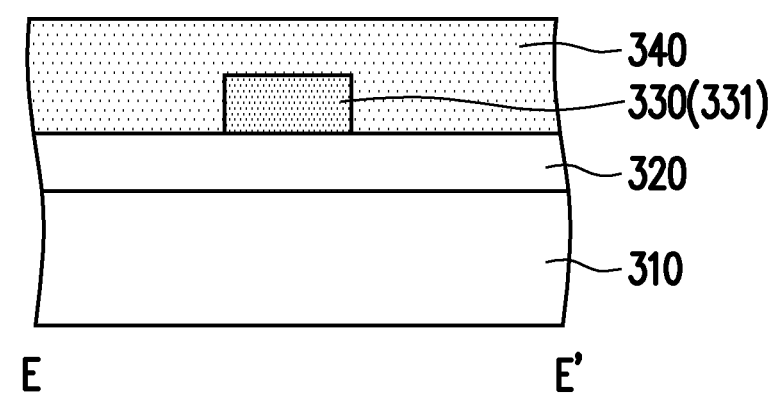
Figure 7C:
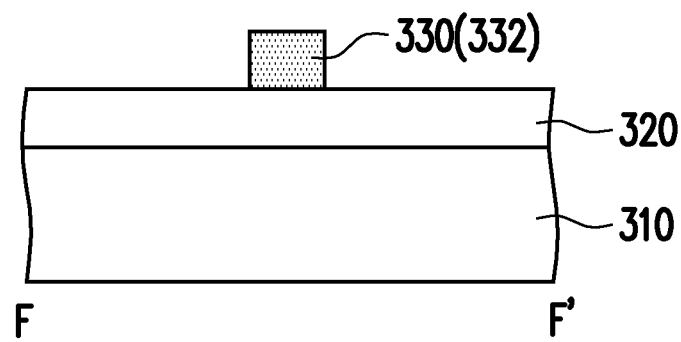
Figure 7D:
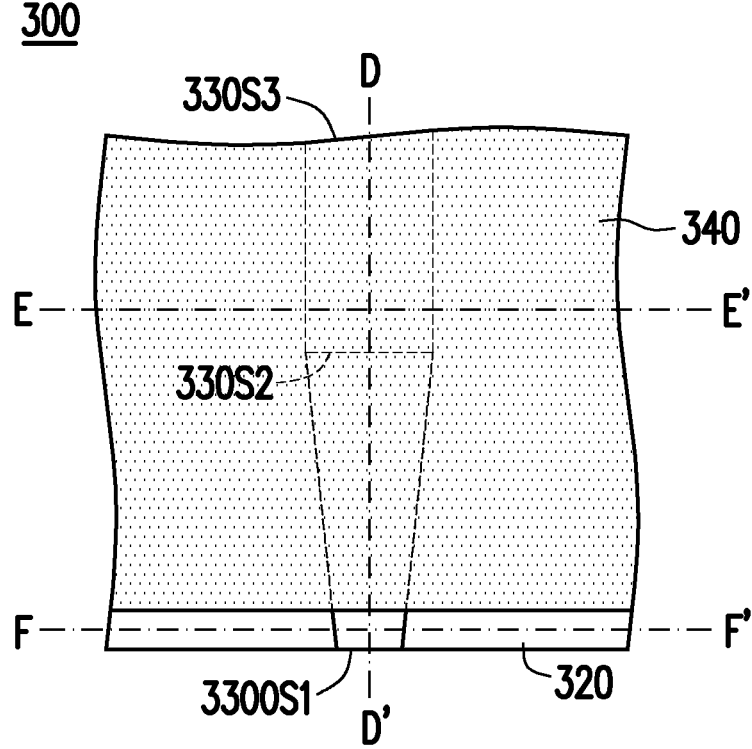

FIG. 7A, FIG. 7B and FIG. 7C are cross-sectional views of FIG. 7D along line DD', line EE', and line FF', and FIG. 7D is a top view of the optical structure 300. Referring to FIGS. 7A to 7D, a layer of optical adhesive 340 is deposited on and partially covers the top surface of the waveguide 330 and the cladding layer 320. As shown in FIGS. 7B and 7D, the optical adhesive 340 covers the straight part 331 of the waveguide 330, and partially covers the taper part 332 of the waveguide 330. As shown in FIGS. 7C and 7D, the optical adhesive 340 partially covers the taper part 332 of the waveguide 330. The wider end 330S2 of the taper part 332 is covered by the optical adhesive 340, and the narrower end 330S1 of the taper part 332 is not covered by the optical adhesive 340. The thickness of the optical adhesive 340 is substantially the same as the total thickness of the thickness of the waveguide 330 and the waveguide 230. In some embodiments, the optical adhesive 340 is polyimide or oxide. The index of refraction of the optical adhesive 340 is smaller than the index of refraction of the waveguide 330 and the waveguide 230.

Figure 8A:
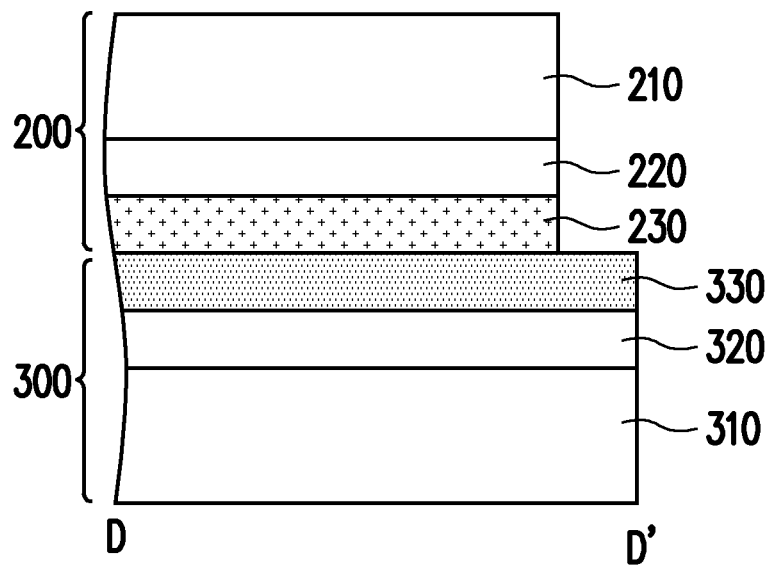
Figure 8B:
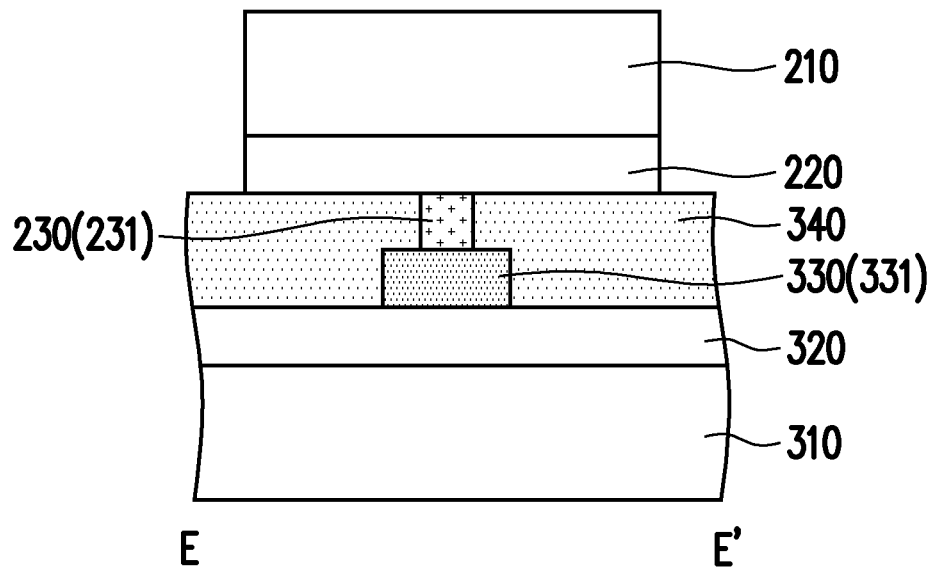
Figure 8C:
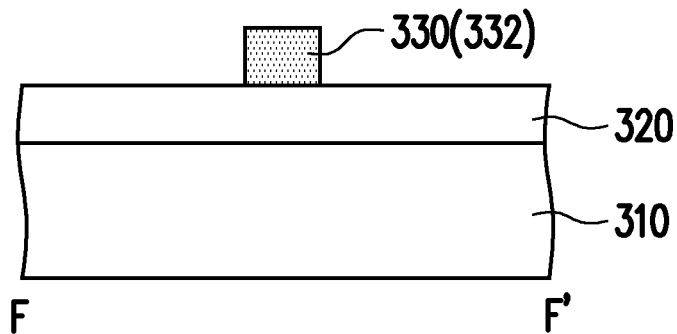
Figure 8D:
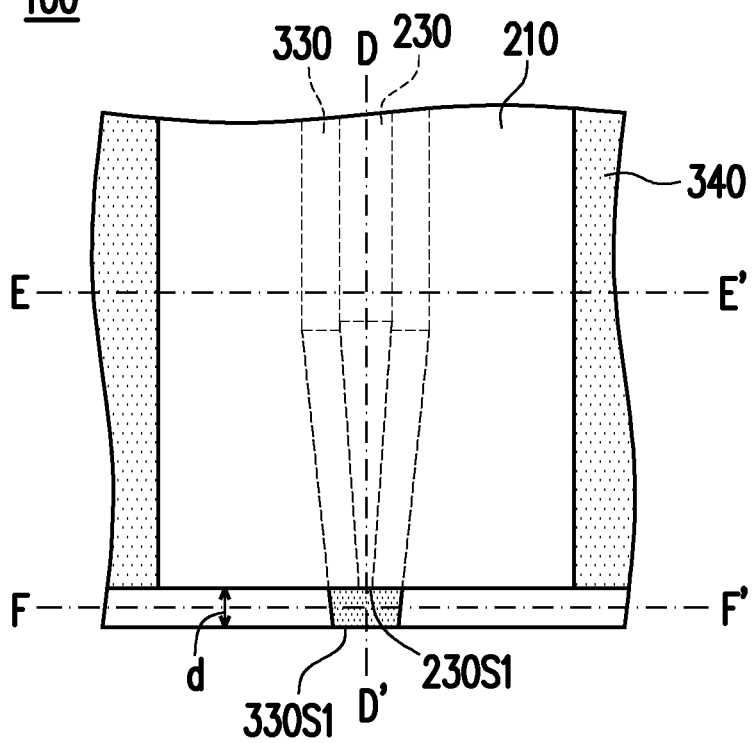

Referring to FIGS. 8A to 8D, FIG. 8A, FIG. 8B and FIG. 8C are cross-sectional views of FIG. 8D along line DD', line EE', and line FF', and FIG. 8D is a top view of an optical coupler 100. The optical structure 200, as shown in FIGS. 4A to 4D, is disposed on the optical structure 300 through a flip-chip method. The optical structure 200 is flipped and the waveguide 230 of the optical structure 200 is disposed on and optically coupled with the waveguide 330 of the optical structure 300. From the top view of the optical coupler 100, the area of the substrate 210 of the optical structure 200 is smaller than the substrate 310, wherein portions of the top surface of the optical adhesive 340 are uncovered by the optical structure 200.

After the optical structure 200 is disposed on the optical coupler 100, the optical adhesive 340 fills the spaces between the cladding layer 320 and the dielectric layer 220. The optical adhesive 340 also surrounds the sidewall of the waveguide 230. Then, the optical coupler 100 is exposed with UV to cure the optical adhesive 340. After curing the optical adhesive 340, the optical structure 200 and is firmly attached on the optical coupler 100, and the waveguide 230 is attached on and optically coupled with the waveguide 330. In some embodiments, the cured optical adhesive 340 is also referred as a cladding layer 340.

When disposing the waveguide 230 on the waveguide 330, a longitudinal axis of the waveguide 230 and a longitudinal axis of the waveguide 330 are substantially aligned from a top view of the optical coupler 100. In some embodiments, the offset between the longitudinal axis of the waveguide 230 and the longitudinal axis of the waveguide 330 from the top view is less than 5 μm. With the waveguide 230 and the waveguide 330 substantially aligned with each other, the optical signal may be transmitted between the two waveguides more efficiently and with less signal loss.

In some embodiments, when disposing the waveguide 230 on the waveguide 330, the narrower end 230S1 of the taper part 232 of the waveguide 230 is separated from the narrower end 330S1 of the taper part 332 of the waveguide 330 by a distance d. In some embodiments, the distance d is between 0 μm to 500 μm.

Figure 9A:
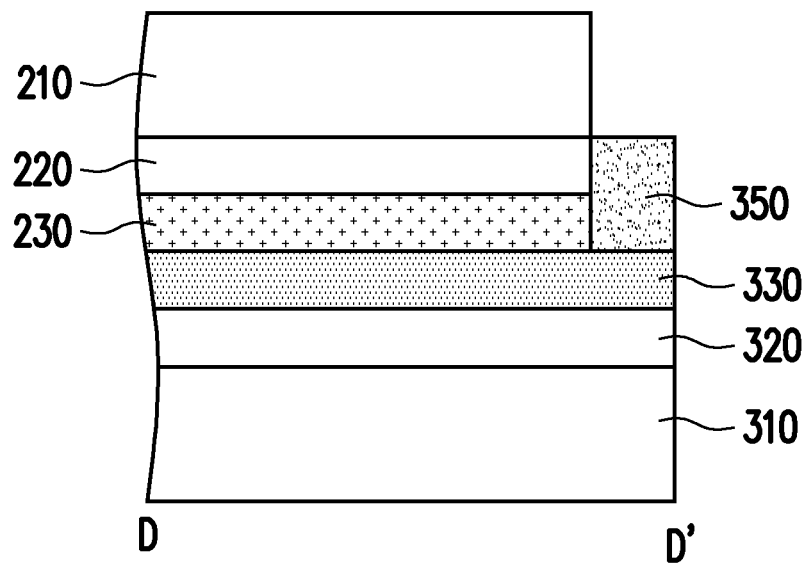
Figure 9B:
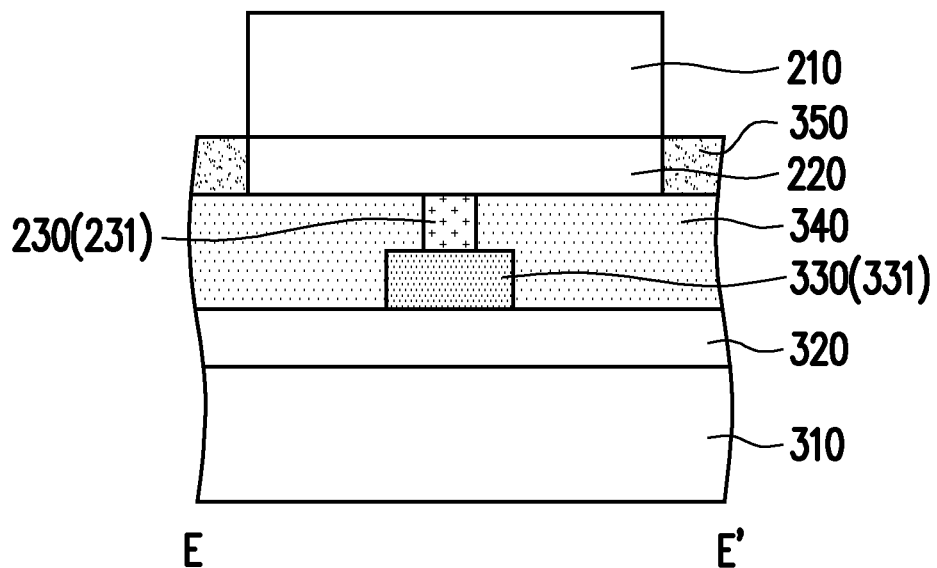
Figure 9C:
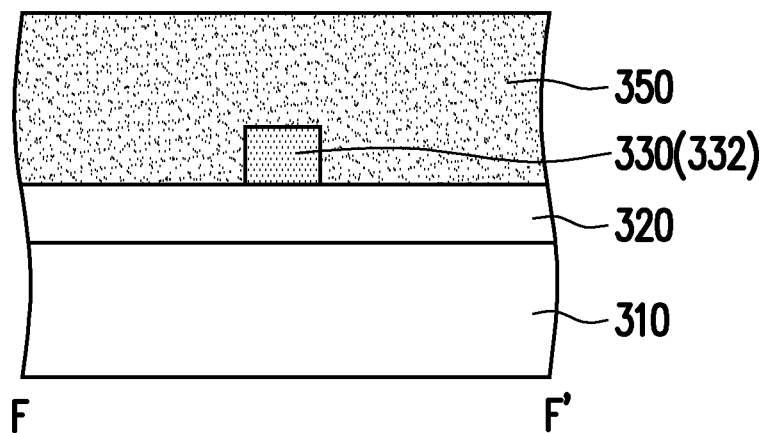
Figure 9D:
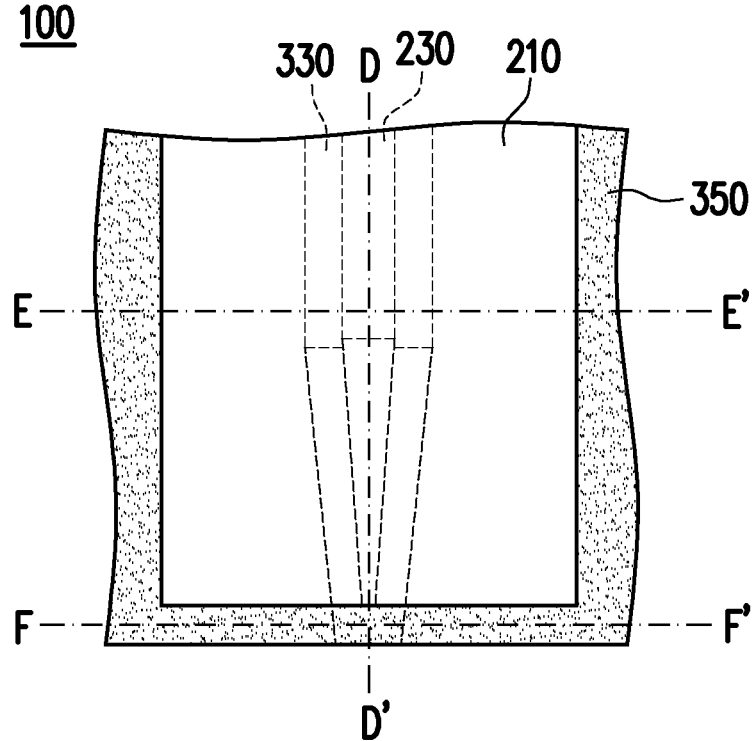

Referring to FIGS. 9A to 9D, FIG. 9A, FIG. 9B and FIG. 9C are cross-sectional views of FIG. 9D along line DD', line EE', and line FF', and FIG. 9D is a top view of an optical coupler 100. A cladding layer 350 is formed on the exposed portion of the cured optical adhesive 340, the exposed portion of the cladding layer 320, and the exposed portion of the taper part 332 of the waveguide 330, which are not covered by the optical structure 200. The material of the formation methods of the cladding layer 350 are similar to the processes for forming the cladding layer 320 as described in FIGS. 5A to 5D, and thus may not be repeated herein. In some embodiments, the material of the cladding layer 350 and the material of the cladding layer 320 are the same. In some embodiments, the material of the cladding layer 350 and the material of the cladding layer 320 are different.

As shown in FIG. 9B, which is the cross-sectional view along the line EE' of FIG. 9D, the cladding layer is formed on the optical adhesive 340, and encloses the dielectric layer 220. As shown in FIG. 9B, the top surface of the cladding layer 350 is substantially coplanar with the top surface of the dielectric layer 220. In some embodiments, the top surface of the cladding layer 350 is above the top surface of the dielectric layer 220 and below the top surface of the substrate 210. In some embodiments, the top surface of the cladding layer 350 is below the top surface of the dielectric layer 220.

As shown in FIG. 9C, which is the cross-sectional view along the line FF' of FIG. 9D, the cladding layer 350 is formed on the exposed portion of cladding layer 320, and on the portion of the taper part 332 of the waveguide 330 which is not covered by the optical structure 200.

Figure 10A:
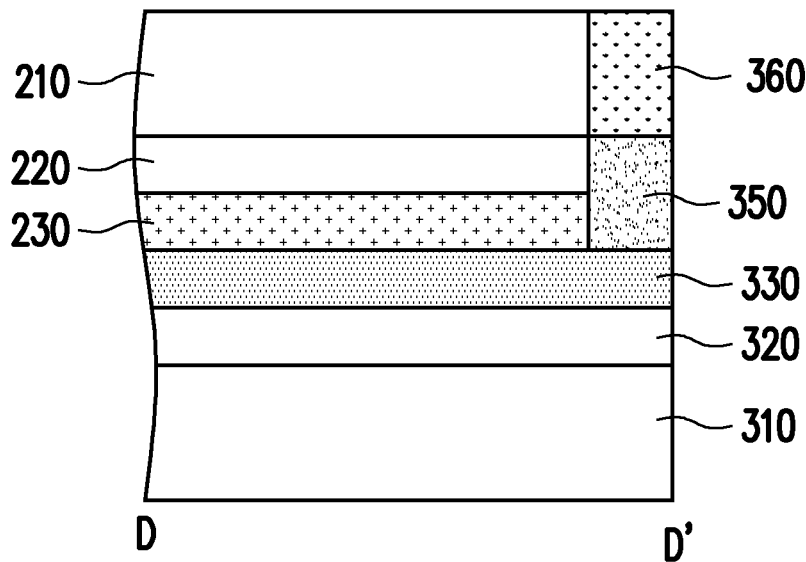
Figure 10B:
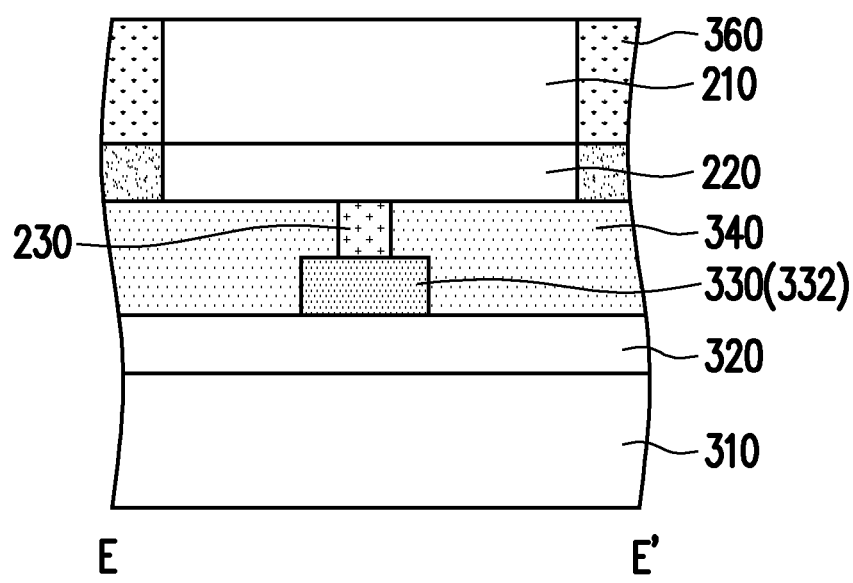
Figure 10C:
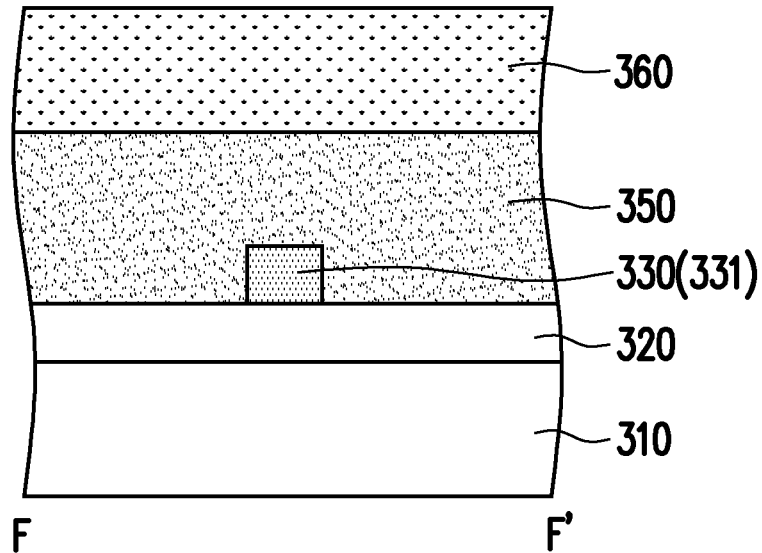
Figure 10D:
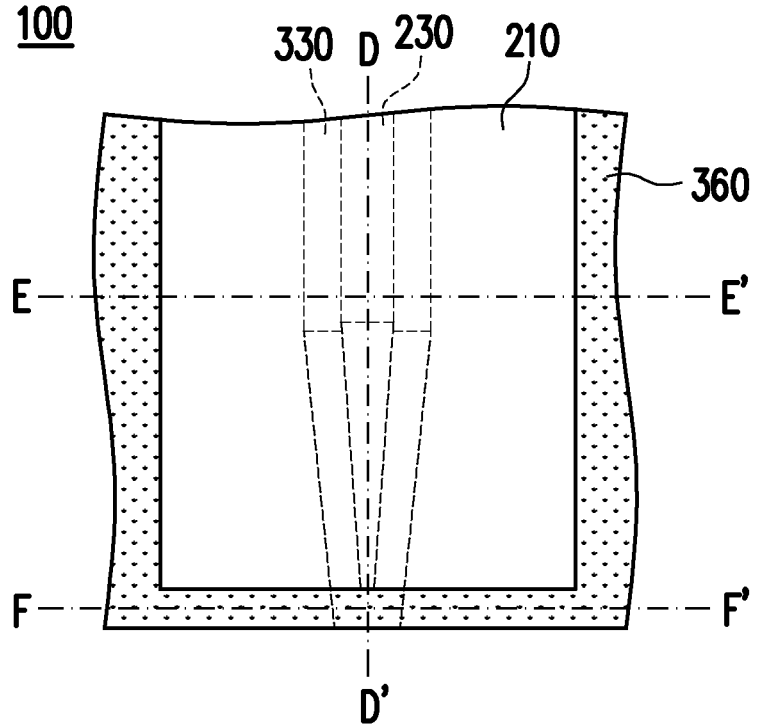

Referring to FIGS. 10A to 10D, FIG. 10A, FIG. 10B and FIG. 10C are cross-sectional views of FIG. 10D along line DD', line EE', and line FF', and FIG. 9D is a top view of an optical coupler 100. A molding compound 360 is disposed on the top surface of the substrate 210 and the cladding layer 350. In some embodiments, the material of the molding compound 360 includes an epoxy, a resin, a moldable polymer, a combination thereof, or the like. In some embodiments, the molding compound 360 is applied while substantially liquid, and then is cured through a chemical reaction, such as in an epoxy or resin. In other embodiments, the molding compound 360 is an ultraviolet (UV) or thermally cured polymer applied as a gel.

After the molding compound 360 is disposed and cured on the top surface of the substrate 210 and the cladding layer 350, the A planarization process is then performed on the molding compound 360 to remove a portion of the molding compound 360, such that the top surfaces of the substrate 210 is exposed. In some embodiments, top surfaces of the substrate 210 and the molding compound 360 are substantially coplanar after the planarization process. In some embodiments, the planarization process is a chemical-mechanical polish (CMP), a grinding process, or the like. In some embodiments, the planarization is omitted if the substrate 210 is already exposed.

In some embodiments, the cladding layer 350 in FIGS. 9A to 9D is omitted, and the cladding layer 350 is replaced by the molding compound 360. The molding compound 360 may be formed on the exposed portion of the cured optical adhesive 340, the exposed portion of the cladding layer 320, and the exposed portion of the taper part 332 of the waveguide 330, which are not covered by the optical structure 200. By replacing the cladding layer 350 with the molding compound 360, the manufacturing process of the optical coupler 100 is simplified.

Figure 11:
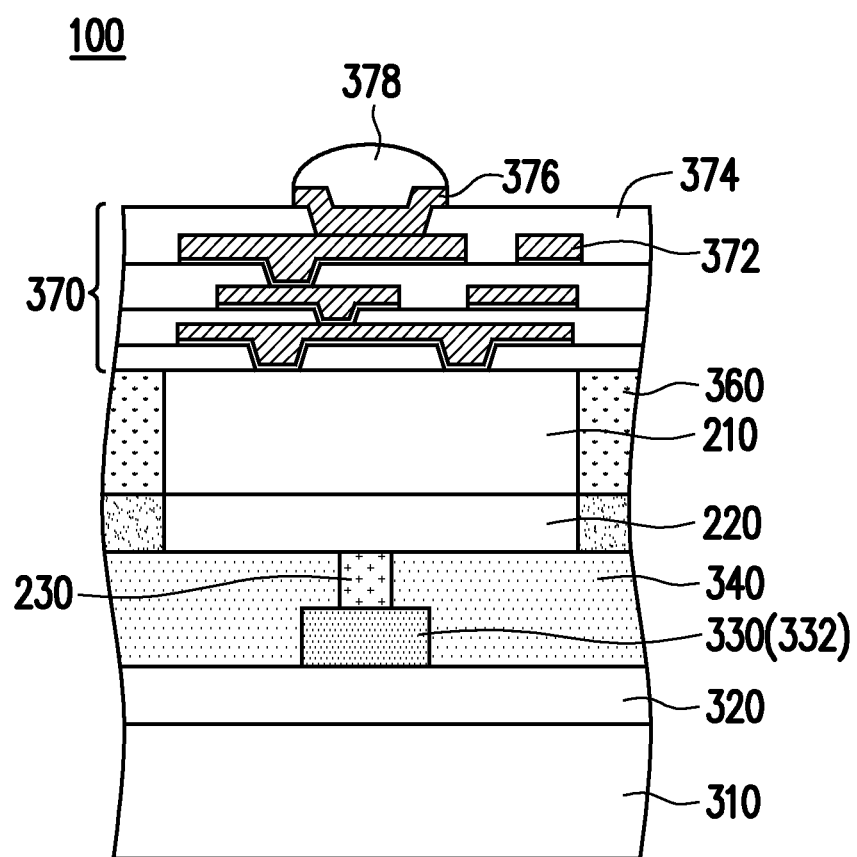

FIG. 11 is a cross-sectional view of the optical coupler 100. A redistribution layer 370 may be formed on the top surface of the substrate 210. The redistribution layer 370 electrically couples with the substrate 210. In some embodiments, the substrate 210 includes a silicon photonic integrated chip (PIC), and the redistribution layer electrically couples with the PIC in the substrate. As shown in FIG. 11, the redistribution layer 370 includes metallization patterns 372, dielectric layers 372, and under bump metallurgies (UBMs) 376.

After forming the redistribution layer 370, conductive connectors 378 are formed on the redistribution layer 370 and coupled to the redistribution layer 370 through the UBMs 376. The conductive connectors 378 may be ball grid array (BGA) connectors, solder balls, metal pillars, controlled collapse chip connection (C4) bumps, micro bumps, electroless nickel-electroless palladium-immersion gold technique (ENEPIG) formed bumps, or the like. The conductive connectors include (such as a copper pillar) formed by a sputtering, printing, electro plating, electroless plating, CVD, or the like.

As a result, the external electric signals may be transmitted to or received from the substrate 210 through the connectors 378, the UBMs 376, and the redistribution layer 370.

Figure 12:
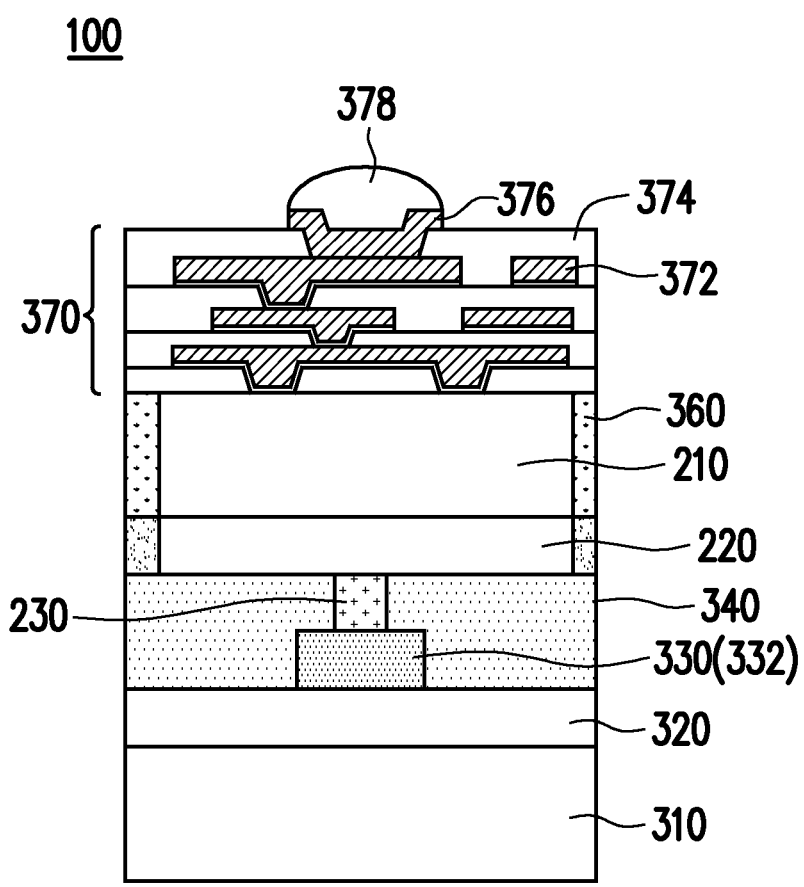

As illustrated in FIG. 12, after forming the redistribution layer 370 and the conductive connectors 378 on the substrate 210 and the molding compound 360, a die-saw (singulation) step is performed on the wafer including substrate 300 to separate the wafer into a plurality of optical coupler 100. In some embodiments, the singulation process may include sawing, laser ablation, etching, a combination thereof, or the like.

In the embodiment of the present disclosure, an optical coupler is formed by including a tapered waveguide and a tapered silicon waveguide coupled together. With this structure, the length of the optical coupler may be reduced, and the coupling efficiency which couples the optical signal from the waveguide to the silicon waveguide is enhanced. Furthermore, the optical coupler which includes a tapered waveguide and a tapered silicon waveguide coupled together may be adapted in a variety of edge couplers which receives an optical signal from an optical source and transmits the optical signal to the photonic IC. Also, by packaging the silicon photonic chip (such as the optical structure 200) on the carrier substrate (such as substrate 310), the formation of the optical coupler may be easily integrated into standard silicon photonic chip processing and packaging.

According to some embodiments, an optical coupler is provided. The optical coupler includes: a first optical structure, and a second optical structure disposed over the first optical structure. The first optical structure includes: a first substrate, a first cladding layer disposed on the first substrate, and a first waveguide disposed on the first cladding layer. The first waveguide includes: a first coupling portion, and the first coupling portion including a first taper part. The second optical structure includes: a second substrate, a dielectric layer disposed on the second substrate, and a second waveguide disposed on the dielectric layer. The second waveguide includes a second coupling portion, and the second coupling portion including a second taper part. The second taper part is disposed on and optically coupled with the first taper part, and a taper direction of the first taper part is the same as a taper direction of the second taper part.

According to some embodiments, an optical system is provided. The optical system includes: an optical source, an optical fiber receiving and transmitting an optical signal from the optical source, and an optical coupler receiving the optical signal from the optical fiber. The optical coupler includes: a first waveguide including a first coupling portion having a first taper part, and a second waveguide disposed on the first waveguide. The second waveguide includes a second coupling portion having a second taper part. The second taper part is disposed on and optically coupled with the first taper part. The first taper part and the second taper part point to the optical fiber.

According to some embodiments, a method of forming an optical coupler, is provided. The method includes: forming a first waveguide on a first substrate, forming a second waveguide on a second substrate, and disposing the second substrate over the first substrate such that the second waveguide is optically coupled with the first waveguide. The first waveguide includes a first coupling portion, and the first coupling portion includes a first taper part. The second waveguide includes a second coupling portion, and the second coupling portion includes a second taper part. A taper direction of the first taper part is the same as a taper direction of the second taper part.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An optical coupler, comprising:
   a first optical structure, comprising:
      a first substrate;
      a first cladding layer disposed on the first substrate;
      a first waveguide disposed on the first cladding layer, the first waveguide comprising a first coupling portion, and the first coupling portion comprising a first taper part and a first straight part; and
   a second optical structure disposed over the first optical structure, the second optical structure comprising:
      a second substrate,
      a dielectric layer disposed on the second substrate; and
      a second waveguide disposed on the dielectric layer, the second waveguide comprising a second coupling portion, and the second coupling portion comprising a second taper part and a second straight part,
   wherein the second taper part is disposed on and optically coupled with the first taper part, and a taper direction of the first taper part is the same as a taper direction of the second taper part, wherein
   the first taper part comprises a wider end and a narrower end opposing to the wider end of the first taper part, the wider end of the first taper part has a first width and the narrower end of the first taper part has a second width smaller than the first width,
   the second taper part comprises a wider end and a narrower end opposing to the wider end of the second taper part, the wider end of the second taper part has a third width and the narrower end of the second taper part has a fourth width smaller than the third width,
   the third width is smaller than the first width, and
   the fourth width is smaller than the second width,
   wherein a first end of the first straight part connects with the wider end of the first taper part, and a width of the first end of the first straight part is the first width,
   the second coupling portion further comprises a second straight part, wherein a first end of the second straight part connects with the wider end of the second taper part, and a width of the first end of the second straight part is the third width,
   the second straight part is disposed on and optically coupled with the first straight part.

2. The optical coupler of claim 1, wherein the first straight part has a constant width of the first width, and the second straight part has a constant width of the third width.

3. The optical coupler of claim 1, wherein a length of the first taper part is substantially equal to or larger than a length of the first straight part.

4. The optical coupler of claim 1, wherein a length of the second taper part is substantially equal to or larger than a length of the second straight part.

5. The optical coupler of claim 1, wherein a length of the first coupling portion is substantially equal to or longer than a length of the second coupling portion.

6. The optical coupler of claim 1, wherein the narrower end of the first taper part is separated from the narrower end of the second taper part by a nonzero distance.

7. The optical coupler of claim 1, wherein a longitudinal axis of the first waveguide and a longitudinal axis of the second waveguide are substantially aligned from a top view of the optical coupler.

8. A method of forming an optical coupler, comprising:
forming a first waveguide on a first substrate, wherein the first waveguide comprises a first coupling portion, and the first coupling portion comprises a first taper part and a first straight part;
forming a second waveguide on a second substrate, wherein the second waveguide comprises a second coupling portion, and the second coupling portion comprises a second taper part and a second straight part; and
disposing the second substrate over the first substrate such that the second waveguide is optically coupled with the first waveguide,
wherein a taper direction of the first taper part is the same as a taper direction of the second taper part, and wherein
the first taper part comprises a wider end and a narrower end opposing to the wider end of the first taper part, the wider end of the first taper part has a first width and the narrower end of the first taper part has a second width smaller than the first width,
the second taper part comprises a wider end and a narrower end opposing to the wider end of the second taper part, the wider end of the second taper part has a third width and the narrower end of the second taper part has a fourth width smaller than the third width,
the third width is smaller than the first width, and
the fourth width is smaller than the second width,
wherein a first end of the first straight part connects with the wider end of the first taper part, and a width of the first end of the first straight part is the first width,
the second coupling portion further comprises a second straight part, wherein a first end of the second straight part connects with the wider end of the second taper part, and a width of the first end of the second straight part is the third width,
the second straight part is disposed on and optically coupled with the first straight part.

9. The method of claim 8, wherein the step of forming the first waveguide on the first substrate further comprises:
forming a first cladding layer on the first substrate; and
forming the first waveguide on the first cladding layer.

10. The method of claim 9, further comprising:
disposing an adhesive layer over the first cladding layer and the first waveguide prior to disposing the second substrate over the first substrate, wherein the adhesive layer laterally surrounding the first waveguide; and
fixing the adhesive layer by UV exposure after disposing the second substrate over the first substrate.

11. The optical coupler of claim 1, wherein an index of refraction of the first waveguide is between 1.5 to 1.8.

12. The optical coupler of claim 1, wherein a ratio of a length of the straight part of the first waveguide to a length of the taper part of the first waveguide is between 1:1 to 1:4.

13. An optical system, comprising:
an optical source;
an optical fiber receiving and transmitting an optical signal from the optical source; and
an optical coupler receiving the optical signal from the optical fiber, the optical coupler comprising:
a first substrate;
a first cladding layer disposed on the first substrate;
a first waveguide disposed on the first cladding layer, the first waveguide comprising a first coupling portion, and the first coupling portion comprising a first taper part and a first straight part; and
a second optical structure disposed over the first optical structure, the second optical structure comprising:
a second substrate,
a dielectric layer disposed on the second substrate; and
a second waveguide disposed on the dielectric layer, the second waveguide comprising a second coupling portion, and the second coupling portion comprising a second taper part and a second straight part,
wherein the second taper part is disposed on and optically coupled with the first taper part, and a taper direction of the first taper part is the same as a taper direction of the second taper part, wherein
the first taper part comprises a wider end and a narrower end opposing to the wider end of the first taper part, the wider end of the first taper part has a first width and the narrower end of the first taper part has a second width smaller than the first width,
the second taper part comprises a wider end and a narrower end opposing to the wider end of the second taper part, the wider end of the second taper part has a third width and the narrower end of the second taper part has a fourth width smaller than the third width,
the third width is smaller than the first width, and
the fourth width is smaller than the second width,
wherein a first end of the first straight part connects with the wider end of the first taper part, and a width of the first end of the first straight part is the first width,
the second coupling portion further comprises a second straight part, wherein a first end of the second straight part connects with the wider end of the second taper part, and a width of the first end of the second straight part is the third width,
the second straight part is disposed on and optically coupled with the first straight part.

14. The optical system of claim 13, wherein a thickness of the first waveguide is larger than a thickness of the second waveguide.

15. The optical system of claim 13, wherein an index of refraction of the first waveguide is between 1.5 to 1.8.

16. The optical system of claim 13, wherein the first width is between 1 to 10 and the second width is between 200 nm to 5 μm.

17. The optical system of claim 13, wherein the third width is between 0.2 μm to 5 μm, and the fourth width is between 60 nm to 5 μm.

18. The optical system of claim 13, wherein a ratio of a length of the straight part of the first waveguide to a length of the taper part of the first waveguide is between 1:1 to 1:4.

19. The optical system of claim 13, wherein a ratio of a length of the first taper part to a length of the second taper part is smaller than or substantially equal to 1:3.

20. The optical system of claim 13, wherein the first straight part has a constant width of the first width, and the second straight part has a constant width of the third width.

* * * * *